United States Patent
Opaluch (10) Patent No.: US 9,067,140 B2
(45) Date of Patent: Jun. 30, 2015

(54) METHOD AND APPARATUS FOR PROVIDING CUSTOMIZED GAMES

(75) Inventor: Robert Edward Opaluch, Riverside, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2208 days.

(21) Appl. No.: 11/950,783

(22) Filed: Dec. 5, 2007

(65) Prior Publication Data

US 2009/0149246 A1    Jun. 11, 2009

(51) Int. Cl.
| | |
|---|---|
| *G09B 3/00* | (2006.01) |
| *A63F 13/30* | (2014.01) |
| *A63F 13/40* | (2014.01) |
| *G06N 5/02* | (2006.01) |

(52) U.S. Cl.
CPC ............... *A63F 13/12* (2013.01); *A63F 13/10* (2013.01); *A63F 2300/69* (2013.01); *G06N 5/022* (2013.01); *A63F 2300/208* (2013.01); *A63F 2300/552* (2013.01); *A63F 2300/5546* (2013.01); *A63F 2300/6018* (2013.01)

(58) Field of Classification Search
CPC ............... A63F 2300/1012; A63F 2300/208; A63F 13/00; A63F 2300/552; A63F 2300/5546; A63F 13/12; A63F 2300/538; A63F 13/10; A63F 2300/6018; A63F 2300/69; G06N 5/022; G06N 99/005
USPC .................................. 463/25, 40–42
See application file for complete search history.

(56) References Cited

U.S. PATENT DOCUMENTS

| | | | | |
|---|---|---|---|---|
| 5,200,890 | A | * | 4/1993 | Pionchon .................. 463/11 |
| 5,890,963 | A | * | 4/1999 | Yen ......................... 463/42 |
| 6,561,811 | B2 | * | 5/2003 | Rapoza et al. ............. 434/236 |
| 6,773,344 | B1 | * | 8/2004 | Gabai et al. ............... 463/1 |
| 7,402,105 | B1 | * | 7/2008 | Hutter et al. ............... 463/42 |
| 2002/0086730 | A1 | * | 7/2002 | Nakai ....................... 463/41 |
| 2006/0003305 | A1 | * | 1/2006 | Kelmar ..................... 434/350 |
| 2007/0015564 | A1 | * | 1/2007 | Walker et al. .............. 463/16 |
| 2007/0248939 | A1 | * | 10/2007 | Miller ..................... 434/188 |

FOREIGN PATENT DOCUMENTS

WO    WO 2007/081519    7/2007

\* cited by examiner

*Primary Examiner* — Justin Myhr (57) ABSTRACT

An approach is provided for developing customized games. Customization information is obtained from a user (or someone preparing the game for the user) in response to a menu of options relating to a game, or is automatically collected from customization information already collected. Gaming information, including rules and design layout, is output in response to the customization information for playing the game.

20 Claims, 6 Drawing Sheets

METHOD AND APPARATUS FOR PROVIDING CUSTOMIZED GAMES

BACKGROUND INFORMATION

The advent of global communication networks (e.g., the Internet) has served as a catalyst for the ubiquity of digital computing devices, as well as the inauguration of increasingly more complex interactive entertainment services, such as online gaming. In addition to fulfilling basic recreational functions, these applications also serve as excellent teaching tools. Namely, games exhibiting unique combinations of graphics and innovative user interactions create memorable experiences, stimulate user interest, and thus, facilitate knowledge retention. It is not surprising that the gaming industry has become a critical and ever growing market segment. Advances in technology, services, and affordability; however, can be better applied to foster the enrichment of society. For example, users tend to quickly tire of conventional games as the content becomes trite and easily maneuvered.

Therefore, there is a need for an approach that seamlessly provides flexible, efficient techniques for the creation and development of player appropriate, dynamic gaming environments.

SUMMARY OF THE INVENTION

A method is carried out by a processor configured to perform steps stored in a nontransitory computer-readable medium. The method includes: receiving a request from a user to subscribe to a game service for generating a customized game; prompting the user for customization information relating to the game upon subscribing the user to the game service, wherein the customization information includes player identity, player preference, or player characteristic; receiving input, from the user via a graphical user interface, specifying the customization information; obtaining content for the game, wherein the content includes educational content or content for assessing a player; and outputting gaming information that includes rules and design layout for playing the game, wherein the content and complexity of the game are modified according to predetermined objectives relating to education, socialization, or a combination thereof. An apparatus having a user interface, an asset manager module, and an inference engine is also disclosed.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for developing customized games are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
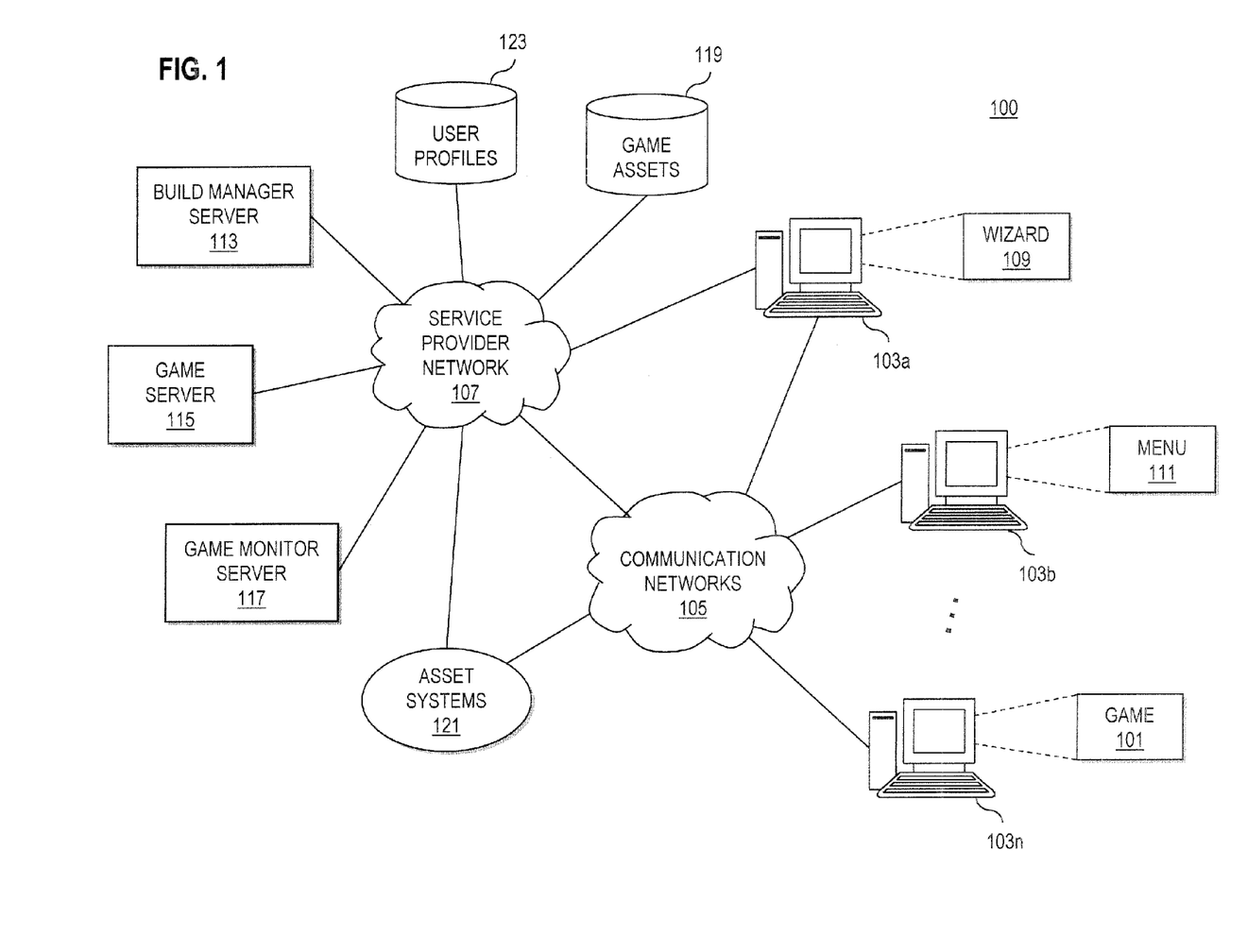
FIG. 1 is a diagram of a system capable of providing customized games, according to an exemplary embodiment.

FIG. 1 is a diagram of a system capable of providing customized games, according to an exemplary embodiment. For the purposes of illustration, a system 100 for providing customized game applications 101 to be developed and/or played on one or more client devices 103a-103n, over one or more communication networks 105, is described with respect to a service provider network 107. While specific reference will be made thereto, it is contemplated that system 100 may embody many forms and include multiple and/or alternative components and facilities.

Traditionally, games have been expensive to develop and modify given the significant resources, testing, compatibility, and follow-up requirements thrust upon developers having to deal with changing system requirements, proprietary platform designs, and a diversity of customer demands, not to mention scouring for the next-best craze. With such onerous barriers associated with the one-off game development model, service providers are uniquely positioned to offer consumers innovative techniques to make gaming more affordable, more personal, and more dynamic. Service providers are able to reach a wider clientele, aggregate abundant resources, and extend the use of games into new arenas, not to mention offer consumers ways to alleviate their content concerns. However, little attention has been afforded to extending and enhancing customized game features within the entertainment arena. Thus, it is apparent that improvements are needed.

For instance, game customization may be provided as an aftermarket component having an "after-the-fact" mentality. For example, third-party developers may construct game "add-ons" that enable modifications to certain gaming elements (e.g., player names, identities, likeness, etc.), but these alternations are, for the most part, minor; the main concept and goal of a game is generally preserved. Essentially, aftermarket technologies merely build upon existing concepts, and therefore, are unable to redesign a game to meet the individualized criteria desired by particular individuals, such as the game players themselves or their parents. Often, this lack of adaptation leads to boredom.

Furthermore, at a most basic level, all games include some aspect that educates players or provides for a socializing opportunity. Unfortunately, these aspects are often incidental byproducts. For the most part, gaming content tends to be static, incapable of player specific evolution, while socialization opportunities tend to be spontaneous interactions, rather than consciously included features that attempt to teach and develop these skills. For those games tailored for educating purposes, the inability to develop or customize a game to individual players (or groups of players) tends to induce player frustration (or stress) with the more difficult concepts, or complacency with the easier materials.

Thus, more flexible, efficient techniques for the creation and development of player appropriate, dynamic gaming environments are needed to increase players' motivations, interests, and ability to learn, as well as provide assessment tools through enjoyable gaming environments.

In one embodiment, service provider network 107 introduces a customized game service whereby subscribers can develop, publish, and/or execute customized games in both "online" and "offline" environments. Additionally (or alternatively), subscribers can monitor game play, assess player traits, and/or progressively adapt customized games to the idiosyncrasies of one or more players. Further, the customized game service enables subscribers to modify the rules and/or the content of the customized games in order to exclusively tailor the complexity of the games (e.g., adaptively increase/decrease game complexity) to the specific skill sets of the one or more players based on, for instance, individual player performance. That is, the customized game service of system 100 may be advantageously utilized in adaptive learning environments, such as in educational institutions, business training situations, and the like. According to other embodiments, service provider network 107 provides a customize game service whereby subscribers can provide customized gaming experiences and opportunities within the same game to one or more players. In other words, the customized game service or system 100, according to certain embodiments, stems from the recognition that players and subscribers, alike, can benefit from more flexible methods to develop custom tailored, content appropriate, dynamic gaming environments. Thus, according to certain embodiments, system 100 provides the customized game service through easily manipulated, intuitive interfaces, such as a wizard 109 application having one or more menus 111 of options for inputting game customization information. According to other embodiments, the interfaces of system 100 provide access to (and use of) various repositories having automatically collected and aggregated game customization information. In other instances, various exemplary embodiments of system 100 enable customized games to be generated that can increase one or more players' motivations, interests, relevance, and/or ability to learn on an individual or group level by providing gaming aspects tailored to one or more players.

Service provider network 107 includes a game application platform (i.e., servers 113, 115, and 117) that implements the customized game service, whereby users can access, develop, monitor, and progressively adapt games via a menu 111 of options relating to game customization information. Namely, the game application platform provides subscribers ubiquitous control over the configuration of games including components, such as game assets (e.g., models, textures, materials, sounds, animations, cinematics, scripts, etc.), characters, complexity, history, character identities, preferences, rules, and subject matter, as well as other suitable configuration parameters like actions, constraints, context, format, interactions, movements, penalties, scores, settings, etc. In this manner, a subscriber of the customized game service may configure and modify game parameters, so as to tailor and actively enhance the edifying nature of the gaming experience. In this regard, customized games developed through system 100 can reach beyond mere entertainment purposes to address needs within the arenas of education, socialization, skills development, assessment, and clinical intervention, as well as other equivalent domains.

As seen in FIG. 1, components at, and included within, system 100 can be connected to one or more networks (e.g., communication networks 105 and/or service provider network 107). These networks may include any type of network, such as, for example, a public data network (e.g., the Internet), various intranets, local area networks (LAN), wide area networks (WAN), the public switched telephone network (PSTN), integrated services digital networks (ISDN), other private packet switched networks or telephony networks, as well as any additional equivalent system or combination thereof. Networks 105 and 107 may employ various access technologies, such as: cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., Verizon® FiOS® network), and the like. As such, networks 105 and 107 may utilize any suitable protocol supportive of data communications, e.g., transmission control protocols (TCP), internet protocols (IP), user datagram protocols (UDP), remote desktop protocol (RDP), hypertext markup languages (HTML), dynamic HTML (DHTML), simple object access protocol (SOAP), file transfer protocols (FTP), telnet, hypertext transfer protocols (HTTP), asynchronous transfer mode (ATM), wireless application protocols (WAP), socket connections (e.g., secure sockets layer (SSL)), Ethernet, frame relay, and the like, to connect client devices 103a-103n to the services of system 100.

Client devices 103a-103n, upon which various embodiments may be executed, can include, for example, any computing, telephony, video, or mobile apparatus capable of sending and/or receiving data, as well as processing audio and/or visual signals. Computing devices may include desktop computers, notebook computers, servers, terminal workstations, console gaming systems, multi-processor systems, microprocessor-based or programmable consumer electronics, minicomputers, mainframe computers, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, pagers, and customized hardware, as well as any other suitable mobile technology. Video devices may include television sets (TVs), liquid crystal displays (LCD), plasma displays, projection displays, projectors, cathode ray tube (CRT) displays, handheld video players, video phones, general purpose media players, portable GPS devices, or other devices with video and/or graphic display capability. Moreover, client-devices 103a-103n may be used alone or in combination with one another to implement various exemplary embodiments.

As shown, service provider network 107 provides client devices 103a-103n access to a build manger server 13 for developing a customized game 101. Build manager server 113 is configured to receive build commands, for example, received through user input via client devices 103a-103n and/or from other build tools, e.g., from among one or more game asset databases 119 and/or third party asset systems 121. According to certain embodiments, build commands are obtained in response to prompting a user through a menu 111 of options relating to a game, wherein the build commands comprise customization information for configuring the game. In other embodiments, build commands may include game assets (i.e., digital content for the game), wherein the assets are either retrieved from a database 119 of the service provider or obtained from a third-party source, such as asset systems 121 and/or client devices 103a-103n. By way of example, build commands are utilized to construct digital content (game assets), e.g., gaming information, that includes rules and design layout for a customized game. This digital content can be configured for a variety of console gaming platforms, handheld gaming platforms, personal computer gaming platforms, as well as computer generated cinematic platforms and those computing, telephony, video, and mobile apparatuses previously delineated. In other embodiments, digital content comprises a digitized version of a physical game that may be mechanically reproduced and manipulated, i.e., played. Build manager server 113 is explained in more detail with respect to FIG. 2.

Figure 2:
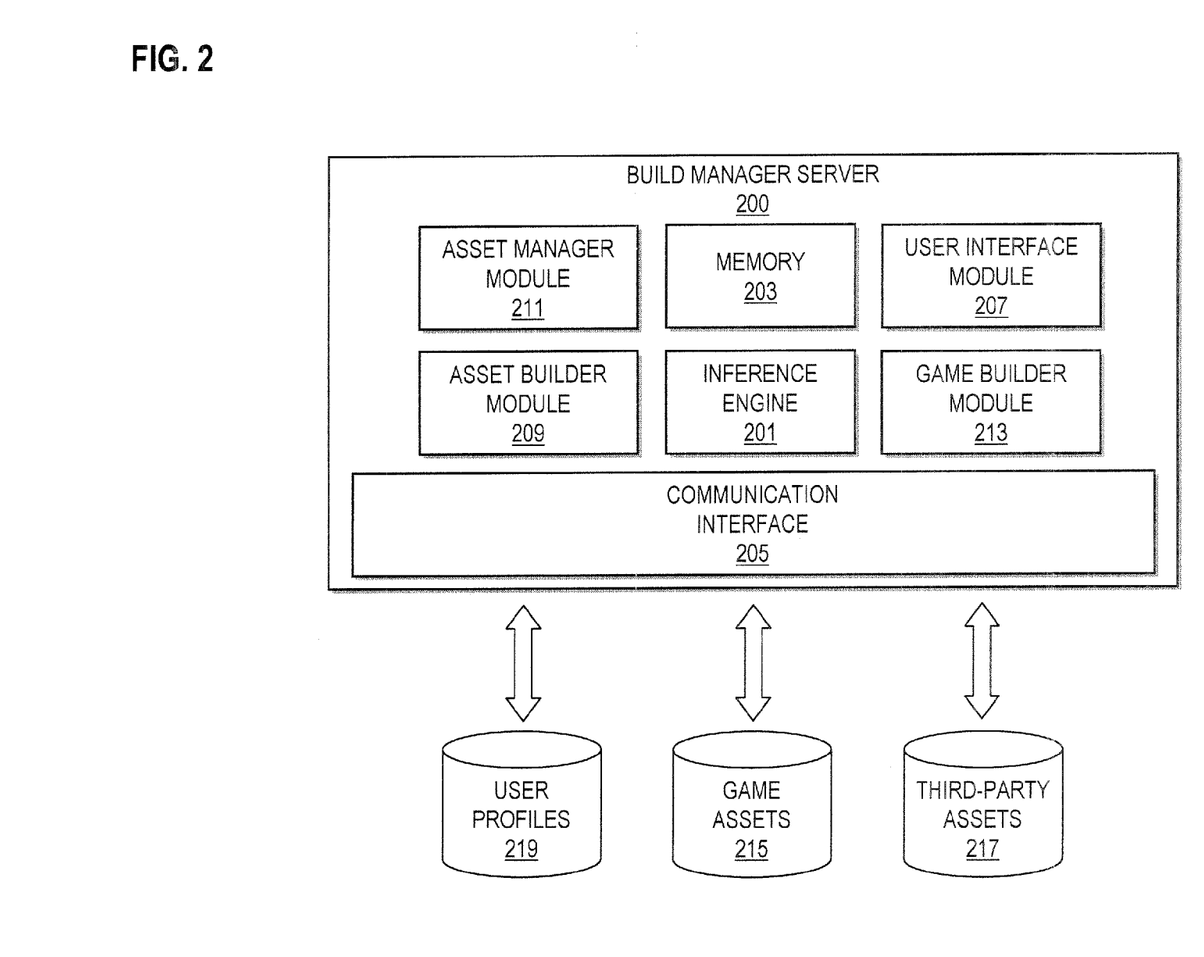
FIG. 2 is a diagram of a build manager capable of developing and modifying customized games, according to an exemplary embodiment.

FIG. 2 is a diagram of a build manager configured for developing and modifying customized games, according to an exemplary embodiment. Build manager server 200 may include: an inference engine 201, memory 203, a communication interface 205, a user interface module 207, an asset builder module 209, an asset manager module 211, and a game builder module 213. In turn, build manager 200 can be in communication with one or more databases, i.e., service provider game assets database 215, third-party game assets database 217, and user profiles database 219. In particular embodiments, build manager 200 may also communicate with a game server 115 and a game monitor server 117. It is contemplated that build manager server 200 may embody many forms and include multiple and/or alternative components.

Inference engine 201 is configured to receive user input relating to game customization options to output gaming information (e.g., rules, design layout, etc.), wherein the gaming information is input to one or more build modules, i.e., asset builder module 209 and/or game builder module 213, for developing and/or modifying a customized game, or a game asset thereof. In essence, inference engine 201 is a control mechanism that applies build rules to select from various game components (e.g., characters, rules, complexity settings, etc.) to be manipulated through the asset builder module 209 and game 213 builder module in response to one or more user commands. That is, inference engine 201 enables all-purpose game creation.

User commands are acquired from a user interface module 207 executing a wizard 109 application configured to prompt a user through a menu of options relating to a game to obtain customization information. In one embodiment, user interfaces are presented in a window(s) of a conventional browser application running on a client device(s) 103a-103n. Alternatively, or additionally, user interfaces may be generated and presented in window(s) controlled by client device(s) 103a-103n. In this manner, subscribers at client devices 103a-103n may input commands to develop and/or modify various game assets and game designs including parameters, such as: models, meshes, textures, materials, sounds, animations, cinematics, scripts, characters, complexity settings, history, characters, identities, preferences, rules, subject matter, actions, constraints, context, format, interactions, movements, penalties, and scores, as well as any other suitable component of a game. According to other embodiments, user interface module 207 permits users to selectively customize the display and control aspects of the user interfaces themselves, such as by configuring and/or modifying the various windows, displays, widgets, utilities, controls, overlays, and themes of the user interfaces, as well as develop and/or tailor any other suitable user interface component, such as building shortcuts to available customized game assets and/or designs. In other instances, user interface module 207 may be employed (in conjunction with inference engine 201, asset builder module 209, and/or game builder module 213) to develop and/or modify one or more user interfaces of a customized game. Thus, user interface module 207 enables subscribers at client devices 103a-103n to select and display desired game and/or user interface components, such that the subscriber can configure (or otherwise modify) those components. As such, user interface module 207 can send signals to and receive signals from a communication interface 205, as well as the other components of build manager server 200.

Communication interface 205 may be configured to receive signals from client devices 103a-103n, including responses to menu options, i.e., build commands, included within a wizard 109 application. Additionally, communication interface 205 is configured to retrieve game content (in response to requests from inference engine 201) for developing and/or modifying a customized game, wherein the game content can be retrieved either from one or more databases 215 of the service provider or from one or more databases 217 of a third-party (e.g., from the subscriber at client devices 103a-103n or from a game asset system 121). According to other embodiments, communication interface 205 may be configured to retrieve user interface components from one or more user interface databases (not illustrated) of system 100 and/or build manager server 200, wherein the user interface databases include libraries of richly interactive user interface components for configuring and/or modifying the user interfaces of user interface module 207 and/or customized games 101. In particular embodiments, communication interface 205 can be configured to receive a customized game from, or transmit customized game commands to, a game server 115 or client devices 103a-103n. In other embodiments, communication interface 205 may be configured to receive user profile information from user profiles database 219. Additionally, communication interface 205 can be configured to receive game performance data from game monitor server 117, wherein inference engine 201 is further configured to modify the customized game options (e.g., rules, content, etc.) of a customized game to increase the complexity of the game based on the received game performance data.

Asset manager module 211 organizes the customized game and/or user interface data into various packages of content for speed and efficiency purposes, i.e., for selection by inference engine 201. Packages are groupings or bundles of game assets, gaming information (e.g., rules, design layout, etc.), and/or user interface components that are stored at one or more databases (e.g., database 215, database 217, user interface database, etc.) or a memory 203 of build manager server 200. In certain embodiments, asset manager module 211 may contain links to various game assets and/or user interface components stored at one or more third-party asset databases 217.

Asset builder module 209 and game builder module 213 are configured to implement various conventional content creation and editor tools, as well as game build tools for developing and modifying a customized game, or a game asset thereof. In particular embodiments, asset builder module 209 and game builder module 213 are responsible for editing new and/or existing game assets or gaming information based on user input, wherein the user input defines properties of new and existing game components for creating and updating gaming information. These tools can include animation content tools, three-dimensional (3D) editors, converters, mesh/material content tools, cinematic content tools, game asset conversion tools, user interface creation/menu tools, audio content tools, real-time renderers, world/level editors, and simulation technology tools, as well as multiplayer technology tools, and build process tools. Resulting game assets, user interfaces, or customized games developed via builder modules 209 and 213 comprise data describing the game, user interface, or the game asset and may be structured in any suitable format (e.g., extensible markup language (XML) schema, binary format, proprietary format, etc.). As such, inference engine 201 may also be configured to take as input, the various output from these editors and tools of asset builder module 209 and game builder module 213, as well as, in certain instances, user interface module 207.

Ultimately, the exchange of data between the components of build manager server 200 comprises a build process for gathering game content and compiling (or formatting) it into a customizable game 101 capable of implementation, i.e., being played, on one or more platforms, including client devices 103a-103n. Completed games 101 and/or developed user interfaces may be stored at build manager server 113, game server 115, and/or one or more shared repositories of service provider network 107.

Referring back to FIG. 1, build manager server 113 may be in communication with a game server 115 and a game monitor server 117 for effectuating game play and/or modifications to a customized game based on game play data. Modifications can be implemented dynamically (i.e., during play of the game), automatically (i.e., based on a subscriber-defined user profile), or in an "ad hoc" fashion (i.e., in response to a command from a subscriber). For instance, a customized game modification (e.g., a complexity level or game structure adjustment) may be dynamically implemented in response to an event occurring during the play of a game, such as an assessment that one or more players are committing too many errors, are experiencing content overload, or are becoming overwhelmed by certain gaming aspects. In this manner, a customized game may be modified to address the needs and/or requirements of one or more players so as to deploy an individually structured, enjoyable gaming experience that may, at the same time, provide a tailored learning experience.

According to one embodiment, game server 115 can be configured to execute customized game applications in response to a request for an available game from one or more players at one or more client devices 103a-103n. In the illustrated embodiment, customized game 101 can be selected by a player from a plurality of game applications that are made available via a menu of selectable customized games. Selection may be effectuated via a selectable image of the menu of selectable customized games. Server 115 may query user profile repository 123 for user profile information associated with the requesting player, wherein the user profile information includes player-specific customized game information configurations. Game server 115 can communicate with build manager server 113 for configuring the customized game according to the user profile information. In other embodiments, game server 115 may obtain previous game information from user profile database 123 to allow players to continue previously saved (and/or uncompleted) games. Accordingly, game server 115 can provide users with customized games 101 progressively tailored to the player's performance, development, and/or special needs.

User profile information may also include information, such as customized or personalized settings that affect any aspect of a customized game accessible to game players, game performance information, configuration parameters, scheduling information, and/or options of a client device or user interface. More specifically, the profile may include: subscription information (account numbers, usernames, passwords, security questions, avatars, selectable images, image files identifying associated users, monikers, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information, such as parallel processing capabilities, mental adroitness, visual intelligence, coordination, problem solving capabilities, maturity, sociability, strategies, psychological awareness, competitive nature, literacy, relative knowledge of a given subject matter, interests, aptitudes, weaknesses, etc. According to other embodiments, user profiles may also include information, such as game play history, specific game play error rates, or the capabilities of a customized game to be used for particular purposes, such as learning, enjoyment, assessment, etc. That is, user profile information may be utilized by subscribers as an index for understanding the customized games themselves, as well as a tool for understanding the players manipulating those customized games. In other instances, user profile information may be supplemented with explicit preferences (e.g., responses to (or forms for filling out) preference questionnaires, or previous modifications to the features and/or preference settings of the components and/or customized games of system 100), as well as choices indicating player interests (e.g., those games, characters, options, etc. that are recursively selected by one or more players).

Customized games 101 can be executed via various components of system 100. For instance, game server 115 can execute one or more game applications and may transmit game data to respective client devices 103a-103n for display. In turn, client devices 103a-103n can receive commands from users via an input device (not shown), wherein client devices 103a-103n, via a communications interface (not illustrated), can transmit these commands to game server 115 to effectuate modifications to the display of the one or more customized games 101. Accordingly, a customized game 101 requested by a user can be operated entirely on game server 115, wherein game server 115 processes and executes commands received from client devices 103a-103n and transmits data corresponding to updated or new displays to the respective devices, such that communication between the respective components is effectuated over one or more data networks (e.g., service provider network 107 and or communication networks 105). In this embodiment, client devices 103a-103n can operate essentially like a terminal that receives content from server 115 for display.

In another embodiment, game server 115 can execute one or more game applications and may transmit game data to respective client devices 103a-103n via build manager server 113, wherein server 113 may dynamically modify a customize game 101 during play of the game. To effectuate modifications to the display of the one or more customized games 101, client devices 103a-103n can receive commands from players and can transmit these commands either directly to game server 115 or indirectly via build manager server 113. Accordingly, a customized game 101 requested by a user can be operated on game server 115 and/or build manager server 113, wherein one or more of these facilities may transmit data corresponding to updated or new displays to client devices 103a-103n. In this embodiment, client devices 103a-103n may still operate essentially like a terminal; however, the customized game may be dynamically modified during play of the game via build manager server 113.

In alternative embodiments, customized games 101 may be operated entirely on client devices 103a-103n, wherein available games requested by a player can be downloaded to client devices 103a-103n, or otherwise made available, such as by an optical disc. In this embodiment, client devices 103a-103n only communicate game performance data to game server 115, in conjunction with, or independently of, communications to a game monitor server 117. Transmissions may occur directly between client devices 103a-1 03n and system 100 components 115 and/or 117 or indirectly via build manager server 113. In other embodiments, the operation of a customized game 101 can be distributed between build manager 113, game server 115, game monitor 117, and/or client devices 103a-103n, as well as other suitable system 100 components.

Alternatively, customized game 101 may be a mechanically reproduced physical game, wherein game performance data may be manually input to game server 115, game monitor 117, and/or build manager server 113, via wizard 109, for effectuating progressive adaptation to one or more components of the customized game 101 In this manner, modified mechanical game components may be received by game players from a service provider (or digitized representations thereof for the players to reproduce, such as by a print mechanism).

Accordingly, a game monitor server 117 can be configured to communicate with client devices 103a-103n, game server 115, and/or build manager server 113 to track player performance associated with playing a customized game 101 and, if necessary, generate game performance reports. Game monitor server 117 may obtain game performance data from game server 115, builder manager server 113, and/or client-devices 103a-103n in real-time, i.e., as the game is being played, or periodically, i.e., based on a predetermined time interval. Thus, game monitor server 117 may acquire game performance data continuously, intermittently, or in an "on demand" fashion. In turn, the game performance data may be stored in a memory (not illustrated) of game monitor server 117 or a repository (not illustrated) associated with game monitor server 117. Alternatively, game performance data may be transmitted to user profile database 123, or any other suitable memory and/or database, such as a memory of the one or more client devices 103a-103n for storage. As such, game performance data may be tracked and stored over a given period of time, such that the data may accessible to one or more subscribers to facilitate a determination as to whether customizable options of a customized game 101 require modification to, for instance, increase the complexity of the game. By way of example, the tracked and/or stored game performance data may also be utilized by game server 115 and/or build manager server 113 to effectuate modifications to a customized game 101 during game play. In this manner, customized games 101 may be advantageously modified in real-time so as to accommodate the specific skill sets of one or more players based on, for instance, individual player performance. Accordingly, such "during game play" modifications may be implemented to correspond to the increasing/decreasing abilities of the one or more players as they, for example, learn new material or require old material to be reviewed. In other embodiments, users may input data into game monitor server 117, game server 115, and/or build manager server 113 as may be required, for instance, with game performance data associated with playing a physical customized game 101, e.g., a physical board game. Player performance associated with game play of physical customized games 101 may be monitored and/or accounted for via the use of video and/or audio recording devices. According to other embodiments, touch and/or location based sensors may be embedded into a physical customized game to capture player performance, as well as include any other suitable method to document the play of physical customized games 101. Further, data captured by the video, audio, and/or sensor devices may be transmitted (or otherwise conveyed) to game monitor server 117, game server 115, and/or build manager server 113. Additionally (or alternatively), the captured data may be transmitted (or otherwise conveyed) to the one or more databases (e.g., user profile database 219) of system 100 and/or the associated storage devices (e.g., memories) of the various components of system 100.

In this manner, customized games can include: action games (e.g., action-adventure, first-person shooter, third-person shooter, scrolling shooter, tactical shooter), adult games, arcade games, adventure games, advergame games, artillery games, control games, dance games, decision games, educational games, fighting games (competitive fighting, brawler), game-in-game games, light-gun games, maze games, multiplayer games, massively multiplayer games, music games, party games, pinball games, platform games, puzzle games, racing games, role-playing games (tactical role-playing, action role playing, fighting role-playing), simulation games (flight, military, space, train, economics, business, building, government, etc.), sports games, stealth games, strategy games (real-time, turn-based, tactical, 4×, etc.), survival horror games, vehicular combat games, as well as traditional games (e.g., board games, card games, word games, etc.). Meanwhile, game performance data associated with playing the above aforementioned games can include parameters, such as: basic statistical information (e.g., scores, levels, correct/wrong answers, time played, decisions made, etc.), as well as analyzed information gleaned from those statistical parameters (e.g., parallel processing capabilities, mental adroitness, visual intelligence, coordination, problem solving capabilities, maturity, sociability, strategies, psychological awareness, competitive nature, literacy, relative knowledge of a given subject matter, interests, aptitudes, weaknesses, etc.).

In an exemplary embodiment, game monitor server 117 can include a report module (not illustrated) for analyzing and reporting game performance data. The report module may gather tracked game performance data on a customized game player to present that information to a subscriber of the customized game service. This presentation includes, for example, written text and/or a graphical display illustrating the customized game player's performance and development. The report module may also gather game performance data of other customized game players and compare that information across two or more individuals, so as to generate a report communicating the relative development of each game player. These comparisons may be further segregated across select geographic regions, specific age groups, socioeconomic statuses, behavioral characteristics, as well other suitable categories corresponding to user profile information within user profile repository 123.

Further, the report module can be configured to generate and transmit reports to subscribers at one or more client devices 103a-103n via wizard 109. In one embodiment, reports are generated based on a policy or configuration of a user profile stored at user profile database 123 or other memory, such as a memory of a client device 103a-103n. Similarly, reports may be generated "on-demand" when requested by a subscriber or other authorized user. As such, game monitor server 117 may communicate (or otherwise deliver) reports to authorized users via client devices 103a-103n. Further, delivery may include conventional techniques, such as by postal mail, fax, e-mail, etc. Thus, these reports can help subscribers determine whether to modify game customization options, so as to maximize the game players' motor development, intellectual development, affective development, and/or social development, as well as other like areas. In other instances, these reports may be utilized for assessment based purposes. For example, generated reports may be used to facilitate determinations as to the individual and/or relative capabilities and/or knowledge of one or more players. It is noted that assessment reports are particularly useful in adaptive learning environments, e.g., for educational purposes, for business training objectives, and the like.

A wizard 109 application may be implemented on (or accessed by) one or more client devices 103a-103n to effectuate the processes described herein. Game wizard 109 permits users to easily, effectively, and intuitively configure and/or modify one or more game customization options for developing and/or adaptively modifying a customized game. In other embodiments, wizard 109 may be utilized to assess a trait of one or more players of a customized game. For example, wizard 109 can collect data associated with playing the customized game by the one or more players to evaluate player traits, such as a psychological profile, an educational level, a level of interest in particular content, or requirements of the players, as well as other suitable character traits. In one embodiment, wizard 109 enables the subscriber (or one or more authorized players) to specify a trait for analysis. As such, customized games 101 may be reactively, proactively, dynamically, or otherwise automatically modified and/or customized via the user profiles. For instance, a subscriber may select and configure aspects of a customized game 101 to be consistent with (or augment) characteristics of a user profile of one or more players. Thus, user profiles advantageously provide a mechanism for tailoring and matching the content, complexity, style, etc., of a customized game 101 to one or more players. As such, customized games 101 created in conjunction with the knowledge gained through user profiles can help subscribers generate customized games 101 with features that can increase player motivations, interests, enjoyment, and ability to learn, as well as provide subject matter that is relevant to the one or more players.

By way of example, wizard 109 compiles data associated with playing a customized game into a convenient, graphically formatted report. More specifically, the game performance report may include feedback information concerning the players' performance in the customized game (e.g., an educational game), wherein the feedback affords subscribers immediate perspective into the players' aptitudes (e.g., abilities, skills, strengths, talents, etc.), interests (amusements, hobbies, occupations, obsessions, etc.), and/or weaknesses (inabilities, deficiencies, handicaps, shortcomings, etc.). In this manner, wizard 109 provides modifiable access to game customization options for the subscribers to modify (either automatically or manually) one or more game parameters based on player performance; thus, progressively maximizing the edifying value of the customized game.

Additionally, or alternatively, wizard 109 may retrieve performance information of other players for performance data comparison between the players. That is, subscribers can review (in a convenient report) the relative development of each player compared to, for instance, the player's peers. In certain embodiments, the comparison report concerns select players within a specified geographic region/locality, or players of like age/maturity, or players having a similar socioeconomic status, or behavioral characteristics, as well other suitable categories corresponding to one or more character traits of the players, such as their psychological profiles, educational levels, levels of interest in particular subject matter or content, or a requirement of the players themselves.

Wizard 109 may be executed, for example, as a user interface capable of local implementation on one or more client devices 103a-103n, such as those computing, telephony, and mobile apparatuses previously delineated. In another embodiment, client devices 103a-103n can remotely access, via a communication interface (not illustrated), one or more of the various servers (e.g., servers 113, 115, and/or 117) of service provider network 107, which can be configured to execute multiple instances of a wizard 109 application. That is, wizard 109 may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, wizard 109 may be executed on one on or more servers of service provider network 107 (e.g., servers 113, 115, and/or 117) in an "online" environment capable of communicating with one or more third-party asset systems 121, web servers (not illustrated), service provider asset databases (e.g., database 119), or equivalent facilities, to provide subscribers various avenues to draw game content from, as well as establish and/or modify one or more customization options of a customized game 101, so as to create and progressively adapt a game to the idiosyncrasies of one or more game players. More specifically, these servers may include one or more processors configured to receive user input concerning one or more customized game options from one or more client devices 103a-103n for configuring (or otherwise modifying) game content made available to one or more users at one or more client devices 103a-103n, wherein the server (s), via the processor(s), are capable of configuring the customized game option(s) according to user input and/or player performance. In particular embodiments, this configuration can be performed in real-time.

As such, exemplary embodiments of wizard 109 may, for instance, comprise hypertext markup language (HTML) user interfaces or JAVA™ applets stored on the various servers (e.g., server 113) and accessed via world-wide-web pages. Further, by enabling access to these servers using a "web paradigm," subscribers are provided a convenient and efficient manner for developing and modifying customized game options. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing. In alternative embodiments, the various servers and modules of those servers of service provider network 107 may be implemented as one or more standalone systems or combined into a platform, as well as a combination thereof. As such, multiple users, interfaces, and instances of wizard 109, customized game 101, build manager server 113, game server 115, and/or game monitor server 117 can be simultaneously realized through system 100.

In one embodiment, client devices 103a-103n and/or wizard 109 may periodically establish a connection with one or more networks (e.g., networks 105 and/or 107) and one or more databases (e.g., user profile database 123) to "push" and "pull" game content, user profile information, and/or commands (e.g., modification signals), such as in a "batched" processing mode. That is, wizard 109 may be virtualized over a networked connection. In another embodiment, these components may initiate peer-to-peer communications such that input and output for developing and/or modifying customized games 101 are executed "on-the-fly," i.e., in real-time, thus, enabling substantially instantaneous results.

In other embodiments, system 100 may include an authentication module (not shown) configured to perform authentication services to determine whether users are indeed subscribers to the customized game service. An authentication schema may require a user name and password, a key access number, a unique machine identifier (e.g., media access control (MAC) address, globally unique identifier (GUID), serial number), etc., as well as a combination thereof. In this manner, the authentication module may be in communication with a user profile database 123, which stores user credentials and personalized information for use by wizards 109. A one time only provisioning authentication procedure may be executed for each client device 103a-103n by transmitting an associated machine identifier and user credentials to the authentication module. Thus, once a subscriber has authenticated a presence on system 100, the user may bypass additional authentication procedures for executing later applications (e.g., customized game development, modification, and/or play). Data packets, such as cookies, may be utilized for this purpose. Thus, once a client device or content source is authenticated, connections between the components may be established directly.

Further, the authentication module may grant users the right to develop, modify and/or play customized games on one or more client devices 103a-103n by revoking existing sets of digital certificates associated with a first client device, and issuing new sets of digital certificates mapped to a second client device. This enables users to initiate secure sessions at any given client device linked to system 100, whether or not the specific client device belongs to that individual user. It is additionally contemplated that multiple rights sessions may exist concurrently.

In certain embodiments, service provider network 107 may also include a system administrator (not shown) for operational and management functions to deploy the customized game service. Accordingly, client devices 103a-103n can utilize any suitable technology to draw, receive, and/or transmit game customization information, user profile information, and control signals from/to system 100 components.

Figure 3:
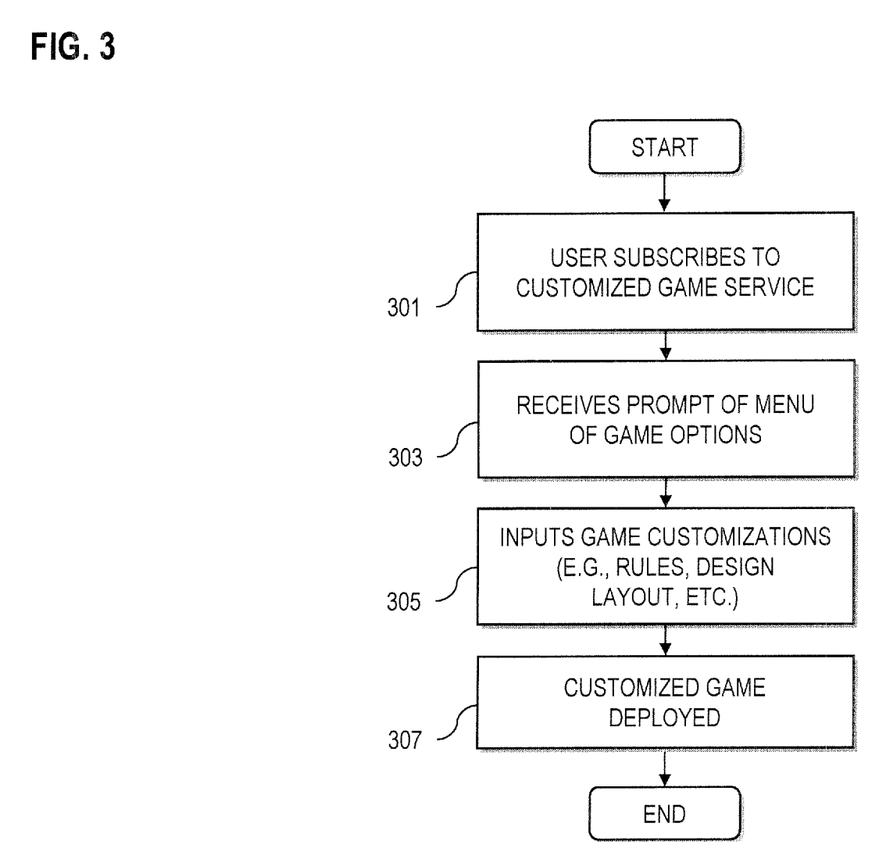
FIG. 3 is a flowchart of a process for deploying a customized game, according to an exemplary embodiment.

While system 100 is illustrated in FIG. 1, the components are exemplary in nature, and indeed, additional or alternative components and/or implementations may be utilized FIG. 3 is a flowchart of a process for deploying a customized game, according to an exemplary embodiment. In step 301, a new user subscribes to the customized game service utilizing, for instance, a client device 103a, which is capable of processing and transmitting data over one or more networks (e.g., networks 105 and/or 107). That is, the user may interact with an input device (described in more detail with respect to FIG. 6) of a client device (e.g., client device 103a) to activate software resident on the device, such as a browser application, that facilitates access to, for instance, a web-based game wizard 109. The software may establish one or more connections service provider network 107 through, for instance, an IP-based connection. Consequently, the user may register as a new subscriber of the customized game service, as well as obtain sufficient authentication information for establishing future sessions.

According to certain embodiments, registration procedures may prompt the user to identify all devices (e.g., client devices 103a-103n) that the user or an associated player may employ to interact with system 100 features, e.g., wizard 109 and/or game 101. The software may automatically search for associated devices, e.g., through a pinging or other suitable procedure. In other embodiments, the user may identify associated devices by entering appropriate device information, such as: device type, serial number, registration number, MAC address, GUID, phone number, communications link, etc. As such, a new subscriber may establish a separate identity for each client device 103a-103n, thereby enabling further opportunities to customize games. When new devices are employed, the software may add the apparatus to the list of devices associated with the user's account.

Once registered and/or authenticated, the subscriber can establish one or more user profiles. That is, the user via client device 103a, can access the user profile database 123 for configuring one or more user profiles, wherein each profile embodies user-defined attributes, polices, customize game configuration data, data associated with game play, etc. for carrying out the functions of system 100. Thus, when a user or player authenticates a presence via, for instance, a client device 103n, the software may provide user-specific interfaces and features based on information stored within an associated user/player profile. In alternative embodiments, user profile information may be stored within respective client devices 103a-103n or other suitable database accessible via networks 105 and/or 107.

Per step 303, the user accesses game wizard 109 to build a customized game. Wizard 109, via user interface module 207, prompts the user through a menu 111 of game options relating to a game to obtain customization information. According to other embodiments, wizard 109 may default to one or more user profiles, wherein a user may select from (or otherwise generate) customization information that is tailored to various aspects of the one or more user profiles. In certain instances, this customization information can be automatically generated by system 100 based on the content within the one or more user profiles. For instance, wizard 109 may be accessed via a browser application implemented on a client device 103a that facilitates logging into, for instance, build manager server 113. In turn, menu 111 facilitates customized game configuration via the logic of inference engine 201. By way of step 305, the user inputs game customization information into wizard 109 by successively responding to various options and/or manipulating various content creator/editor/build tools. In certain embodiments, customization options include board layout options (e.g., circular flow, single or multiple path layouts, beginning/ending positions, series of positions, two-dimensional worlds, three-dimensional worlds, use of real-space, continuous space, checkerboard or other segmented positions, spatial outer boundaries, inner blocked areas, etc.), locations of players/characters, location history to replay or analyze game play, game rules (which may vary in complexity based on performance), age-appropriateness, cultural constraints, quantitative skills, movement rules, turn-taking, actions of players/characters/events, actions of non-players/characters/events, interactions among players or other game entities, assets, scores, point acquisitions, losses, debits, penalties, content (characters, actions, interactions, locations, subject matter, etc.), as well as other game components.

At step 307, build manager 113 compiles the customized game and stores it to a shared memory, wherein game server 115, for instance, deploys the customized game for selection and play by one or more game players. In particular embodiments, the game may be a digital game (e.g., video game). In other instances, the game may be a digitized version of a physical game requiring mechanical reproduction.

According to certain embodiments, customized games may be dynamically modified by build manager while the customized game is being executed based on, for example, one or more players' performance.

Figure 4:
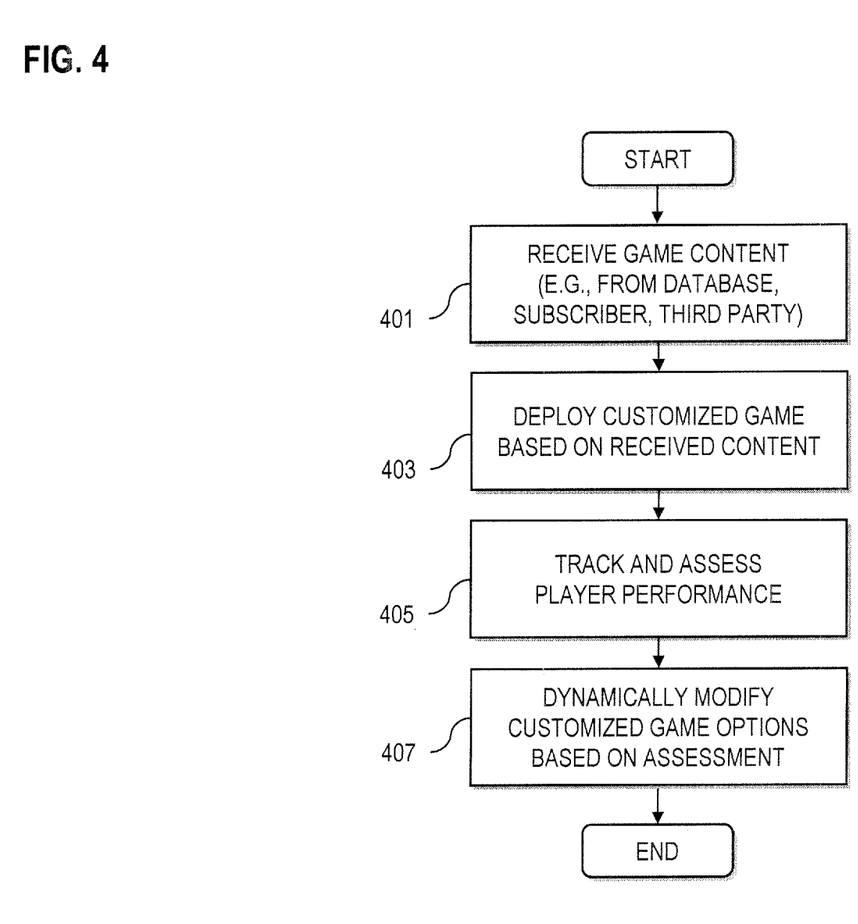
FIG. 4 is a flowchart of a process for dynamically modifying a customized game, according to an exemplary embodiment.

FIG. 4 is a flowchart of a process for dynamically modifying a customized game, according to an exemplary embodiment. In step 401, build manager 113 receives specified game content for compiling a customized game 101, where the game content may be retrieved from a database 119 of a provider or obtained from a third party source, such as asset systems 121 and/or client devices 103a- 103n. Per step 403, build manger server 113 compiles the customized game O 1 based on the received content and deploys it over, for instance, the Internet. At step 405, a player accesses the customized game 101 at, for instance, client device 103n. The game may be executed and played in a variety of ways. For example, game 101 may be executed on game server 115 and/or build manager server 113, such that game commands issued by the player to the client device 103n are transmitted to, received by, and executed at game server 115 and/or build manager server 1 3. In this embodiment, client device 103n substantially operates as a terminal. Accordingly, game server 115 may execute game 101, while game monitor server 117 tracks the game performance of the player and stores the game performance data in a suitable location, e.g., user profile database 123. Alternatively, a copy or version of game 101 can be downloaded to client device 103n, such that the operation of the game and the execution of the game commands received at client device 103n from the player occur at device 103n. In this embodiment, gaming data may be transmitted to build manager server 113, game server 115, game monitor server 117, and/or user profile database 123. As such, game performance data may be stored at a suitable location.

Game monitor server 117, via a report module may analyze the player performance data (e.g., score within a predetermined time interval) and transmit such information to build manager server 113 either directly or indirectly via game server 115. Inference engine 201 of build manager 113 may determine (based on the analyzed player performance data) that the complexity of the game requires modification. As such, build manager 113 via game builder module 213 can dynamically modify a game complexity setting, per step 407. The updated complexity setting may be stored to user profile database 123, as well as transmitted to game server 115 for modification of the customized game being executed. As such, the complexity will adjusted during the play of the game based on the player's performance.

Figure 5:
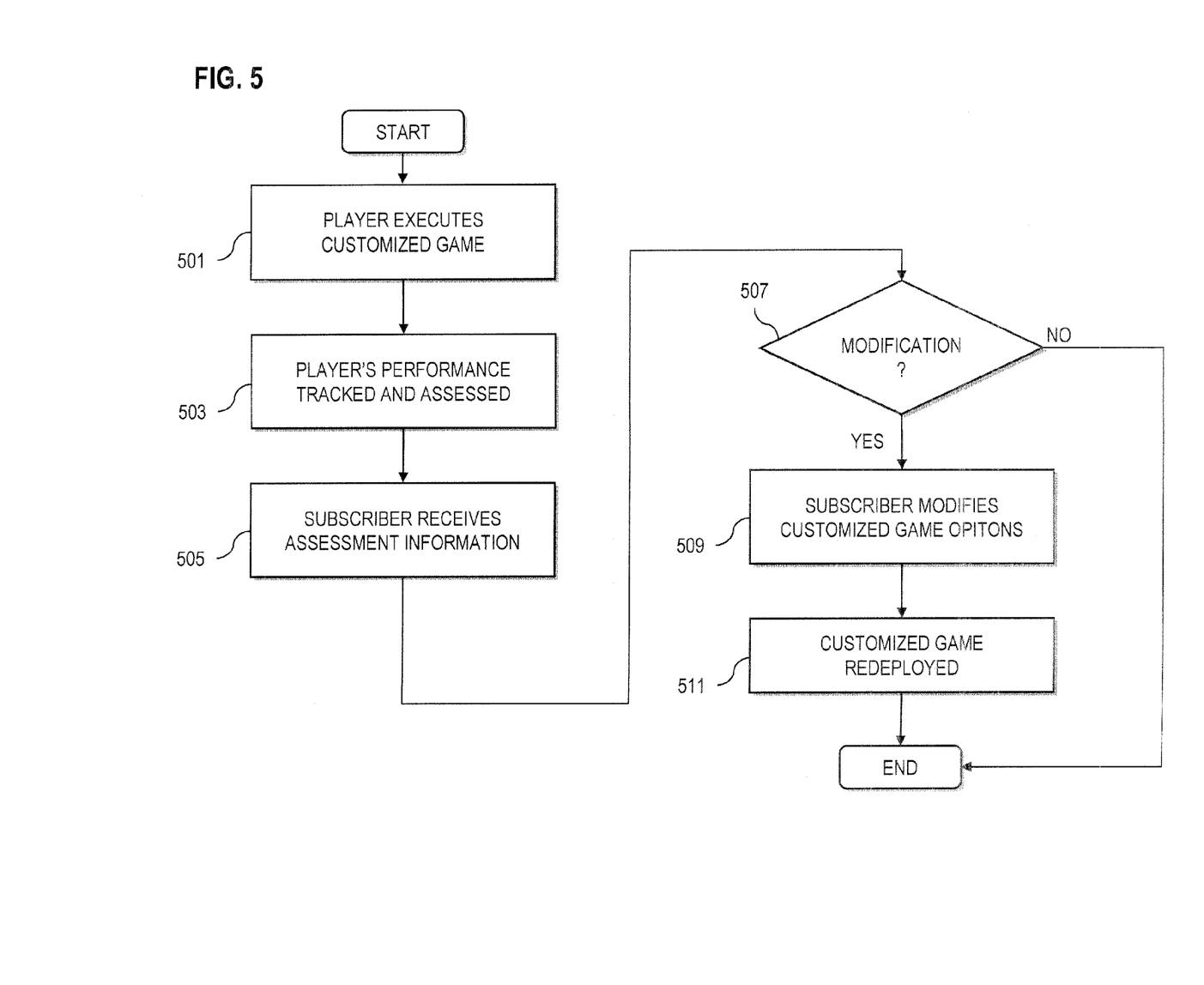
FIG. 5 is a flowchart of a process for "ad hoc" customized game modifications, according to an exemplary embodiment.

According to another embodiment, customized games may be manually modified by a subscriber to the customized game service based on, for example, one or more players' performance. FIG. 5 is a flowchart of a process for "ad hoc" customized game modifications, according to an exemplary embodiment. In step 501, a player executes a customized game instance 101 via, for example, client device 103n. At step 503, game monitor server 117 tracks the game performance of the player and stores various analyzed statistical parameters (generated via a report module) to user profile database 123. Per step 505, user interface module 207 extracts the analyzed statistical parameters from the user profile database 123 and formats the information into a displayable report, e.g., a pie chart representing, for instance, a psychological profile of the game player. By way of communication interface 205, the report is received by a subscriber to the customized game service of system 100 via, for instance, a web-based wizard 109 application. By way of example, the psychological profile may illustrate aggressive behaviors of the game player in response to overly competitive customized games dealing with sports related subject matters. Based on the information within the report, the subscriber may determine whether modification to one or more game customization options is necessary, per step 507. If not, the process ends, otherwise, the subscriber may, via the wizard 109 application, modify appropriate game customization options, per step 509. For instance, the subscriber may decrease the rewarding outcomes resulting from aggressive behavior, and increase the rewards from team playing to reduce the aggressiveness of the game player. The subscriber may also change the subject matter of the game from sports to an educational genre, such as science. Upon completion of the necessary modifications, build manager server 113 and/or game server 115 may redeploy the newly amended customized game, as in step 511. It is contemplated that this process may be cyclical in nature, i.e., the subscriber may continually receive performance based reports to continually modify a customized game to suit various idiosyncrasies of the executing players. As such, customized games may be progressively tailored to the player's performance, development, and/or special needs.

The processes described herein for developing, executing, and/or modifying customized games may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
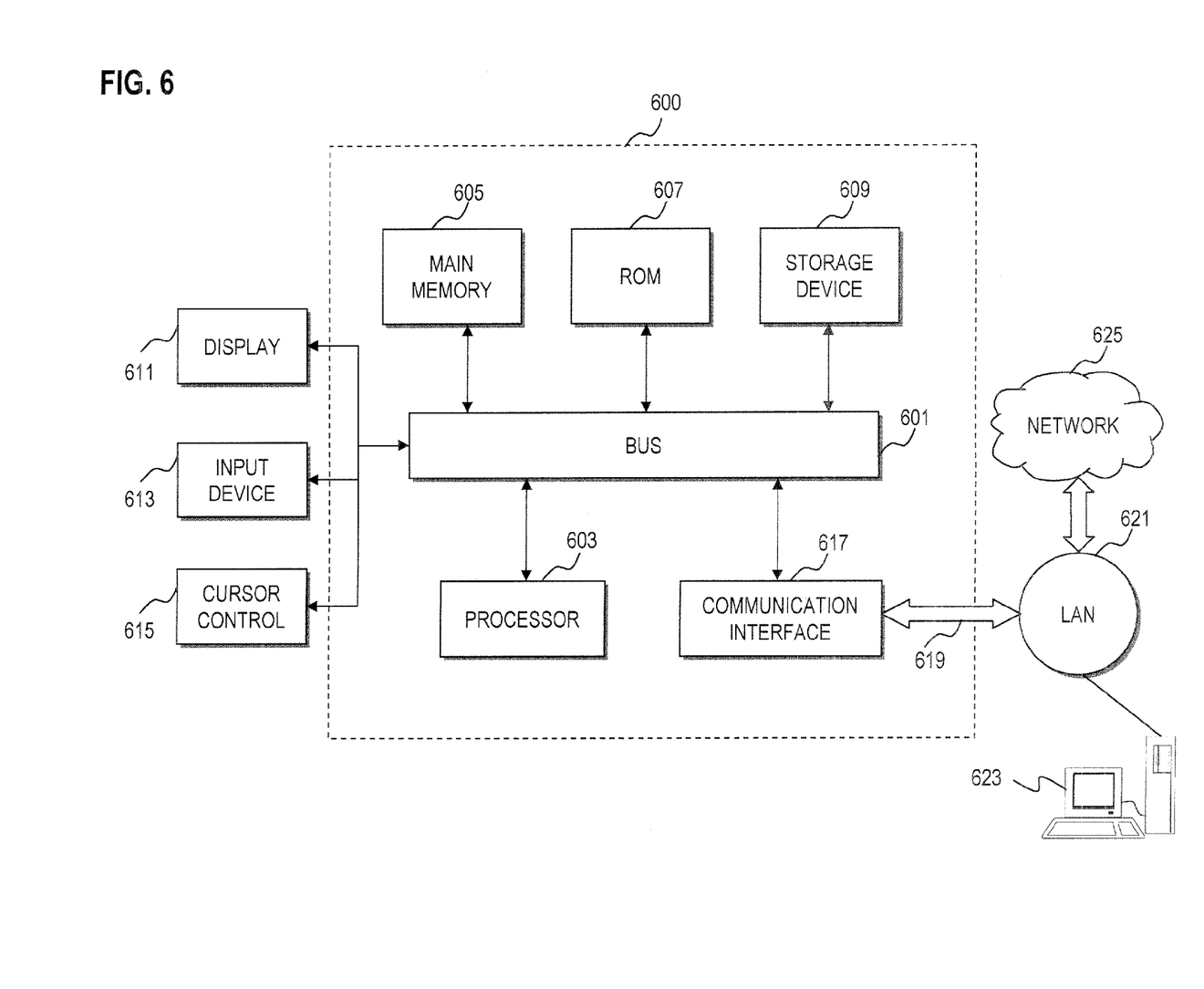
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, game pad, instrumented sports equipment, voice recognition technology, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the preferred embodiments have been described herein, alterations thereto, and other embodiments and implementations of the invention as set forth in the attached claims are possible. Accordingly, the scope of the invention is not limited to the description provided herein, but rather covers various modifications and equivalent arrangements.

What is claimed is:

1. A method performing steps, stored in a nontransitory computer readable medium, by a processor, said steps comprising:
   receiving a request from a user to subscribe to a game service for generating a customized game;
   prompting the user through a menu of options relating to the game to obtain customization information upon subscribing the user to the game service, wherein the customization information includes player identity, player preference, or player characteristic;
   receiving input, from the user via a graphical user interface, specifying the customization information;
   obtaining content for the game, wherein the content includes educational content or content for assessing a player;
   monitoring a gaming performance of the user based on one or more physical actions, one or more physical movements, or a combination thereof, of the user during the game as detected by one or more sensors, one or more devices, or a combination thereof; and
   outputting via an inference engine gaming information that includes rules and design layout for playing the game, wherein the content and complexity of the game are modified according to the gaming performance and predetermined objectives relating to education, socialization, or a combination thereof.

2. A method according to claim 1, wherein the game is a video game, and the game is modified dynamically during play of the game.

3. A method according to claim 1, further comprising:
   collecting data associated with play of the game for assessing a trait of a player of the game, the trait including a psychological profile, educational level, level of interest in a particular content, or requirements of the player.

4. A method according to claim 1, further comprising:
modifying the rules or the content in real time based, at least on part, on the gaming performance of the user to adjust the complexity of the game for the user, wherein the gaming performance is further associated with one or more gaming actions, one or more gaming interactions, one or more gaming movements, or a combination thereof, of the user during the game, and
the pre-determined objectives are further related to skills development, assessment, clinical intervention, or a combination thereof.

5. A method according to claim 4, further comprising:
determining one or more errors, content overload, or of a combination thereof, of the user based, at least in part, on the gaming performance; and
decreasing the complexity of the game for the user based on the determination.

6. A method according to claim 1, wherein the menu facilitates customized game configuration via logic of the inference engine, the content is either retrieved from a database of a provider or obtained from the user, and the content includes educational content or content for assessing a player.

7. A method according to claim 6, wherein the menu is part of a wizard application that outputs the gaming information, and the customization information includes one or more player identities, one or more player preferences, one or more player characteristics, or a combination thereof.

8. A method according to claim 6, wherein data associated with play of the game is collected for assessing one or more traits of a player of the game, and the one or more traits include one or more psychological profiles, one or more educational levels, one or more levels of interest in a particular content, or a combination thereof, of the player.

9. A method according to claim 6, wherein the customized game is a mechanically reproduced physical game, a physical board game, or a combination thereof.

10. A method according to claim 1, wherein the one or more sensors, the one or more devices, or a combination thereof include one or more video recording devices, one or more audio recording devices, one or more sensor devices, or a combination thereof.

11. An apparatus comprising:
a user interface configured to receive a request from a user to subscribe to a game service for generating a customized game, and to prompt the user through a menu of options relating to the game to obtain customization information upon subscribing the user to the game service, wherein the customization information includes player identity, player preference, or player characteristic, the user interface being further configured to receive input from the user specifying the customization information;
an asset manager module configured to obtain content for the game, wherein the content includes educational content or content for assessing a player; and
an inference engine configured to monitor gaming performance of the user based on one or more physical actions, one or more physical movements, or a combination thereof, of the user during the game as detected by one or more sensors, one or more devices, or a combination thereof, and configured to output gaming information that includes rules and design layout for playing the game, wherein the content and complexity of the game are modified according to the gaming performance and pre-determined objectives relating to education, socialization, or a combination thereof.

12. An apparatus according to claim 11, wherein the game is a video game, and the game is modified dynamically during play of the game.

13. An apparatus according to claim 11, further comprising:
a memory configured to store data associated with play of the game for assessing a trait of a player of the game, the trait including a psychological profile, educational level, level of interest in a particular content, or requirements of the player.

14. An apparatus according to claim 11, wherein an inference engine is further configured to modify the rules or the content in real time based, at least on part, on gaming performance of the user to adjust the complexity of the game for the user, wherein the gaming performance is associated with one or more actions, one or more interactions, one or more movements, or a combination thereof, of the user during the game.

15. An apparatus according to claim 14, further comprising:
a processor configured to determine one or more errors, content overload, or of a combination thereof, of the user based, at least in part, on the gaming performance, and to decrease the complexity of the game for the user based on the determination.

16. An apparatus according to claim 11, wherein the menu facilitates customized game configuration via logic of the inference engine, the content is either retrieved from a database of a provider or obtained from the user, and the content includes educational content or content for assessing a player.

17. An apparatus according to claim 16, wherein the menu is part of a wizard application that outputs the gaming information, and the customization information includes one or more player identities, one or more player preferences, one or more player characteristics, or a combination thereof.

18. An apparatus according to claim 16, wherein data associated with play of the game is collected for assessing one or more traits of a player of the game, and the one or more traits include one or more psychological profiles, one or more educational levels, one or more levels of interest in a particular content, or a combination thereof, of the player.

19. An apparatus according to claim 16, wherein the customized game is a mechanically reproduced physical game.

20. A system comprising:
a plurality of client devices; and
at least one server configured to:
receive via a graphical user interface a request from a user of at least one of the user device to subscribe to a game service for generating a customized game,
prompt the user through the graphical user interface a menu of options relating to the game to obtain customization information upon subscribing the user to the game service, wherein the customization information includes player identity, player preference, or player characteristic, the user interface being further configured to receive input from the user specifying the customization information,
obtain content for the game, wherein the content includes educational content or content for assessing a player,
monitor gaming performance of the user based on one or more physical actions, one or more physical movements, or a combination thereof, of the user during the game as detected by one or more sensors, one or more devices, or a combination thereof, and
output gaming information that includes rules and design layout for playing the game, wherein the content and complexity of the game are modified according to the gaming performance and pre-determined objectives relating to education, socialization, or a combination thereof.

* * * * *